United States Patent [19]

Inoue et al.

[11] Patent Number: 5,466,726

[45] Date of Patent: Nov. 14, 1995

[54] ANTIBACTERIAL, ANTIFUNGAL SILICONE RUBBER COMPOSITION

[75] Inventors: Yoshio Inoue; Sekiguchi Susumu, both of Annaka; Yasuo Kurihara, Minato, all of Japan

[73] Assignee: Shin-Etsu Chemical Co., Ltd., Tokyo, Japan

[21] Appl. No.: 297,522

[22] Filed: Aug. 26, 1994

[30] Foreign Application Priority Data

Aug. 27, 1993 [JP] Japan .................... 5-235798

[51] Int. Cl.⁶ ................ C08K 3/34; C08K 3/10
[52] U.S. Cl. ............... 523/122; 524/450; 524/588; 524/789; 524/860
[58] Field of Search ............. 523/122; 524/450, 524/588, 789, 860

[56] References Cited

U.S. PATENT DOCUMENTS

| | | | |
|---|---|---|---|
| 4,477,625 | 10/1984 | Lockhart | 524/450 |
| 4,499,229 | 2/1985 | Lockhart | 524/450 |
| 4,499,230 | 2/1985 | Lockhart | 524/450 |
| 4,938,958 | 7/1990 | Niira; deceased et al. | 523/122 |
| 5,180,402 | 4/1993 | Kubota et al. | 523/122 |
| 5,204,402 | 4/1993 | Foster et al. | 524/450 |

*Primary Examiner*—Melvyn I. Marquis
*Assistant Examiner*—Karen A. Dean
*Attorney, Agent, or Firm*—Millen, White, Zelano & Branigan

[57] ABSTRACT

A silicone rubber composition mainly comprising an organopolysiloxane of the average compositional formula: $R_n^1 SiO_{(4-n)/2}$ wherein $R^1$ is a substituted or unsubstituted monovalent hydrocarbon group and $n=1.98$ to $2.02$ can be rendered antibacterial and antifungal by blending a zeolite containing 0.1 to 15% by weight of a silver ion.

5 Claims, No Drawings

ANTIBACTERIAL, ANTIFUNGAL SILICONE RUBBER COMPOSITION

BACKGROUND OF THE INVENTION

1. Field of the Invention

This invention relates to an anti-bacterial, antifungal silicone rubber composition which imparts antibacterial and antifungal properties to silicone rubber products for improving the living environment, prolonging the lifetime and improving food hygienics.

2. Prior Art

In the recent years, silicone rubber is used in a wide variety of applications covering electronic, automotive, building, medical and food industries because of its excellent properties including weatherability, electrical properties, low compression set, heat resistance, and low-temperature resistance. Typical uses include packings or gaskets in refrigerators, electric rice cookers, and electric pots as exemplary home appliances, packings in food-keeping containers, and medical tubes like catheters. The demand for silicone rubber is increasing and there is a need for developing a silicone rubber having more improved properties.

It was recently proposed to add antifungal agents to render silicone rubber antifungal. Most antifungal agents used heretofore are organic agents such as benzimidazole, and methylsulfonyl. Since these organic agents are susceptible to a temperature change, light like ultraviolet radiation, a humidity change, or trace components in the environment and can be deteriorated thereby, their effect does not last long.

Attempts have been made for sustaining the antifungal effect by coating or capsulating such organic antifungal agents or by adding active substances to the silicone polymer. These attempts, however, suffer from several problems, for example, (1) an increased cost, (2) failure to exert effect because organic antifungal agents can be buried in silicone rubber, (3) difficultly of storage because products treated with antifungal agents gradually deteriorate in effect even if they are not in use, and (4) degradation by heat vulcanization because organic antifungal agents are degraded thereby to drastically drop their effect and discolor silicone rubber moldings.

More recently, inorganic antifungal and antibacterial agents were developed. For example, Japanese Patent Application Kokai (JP-A) No. 1226/1993 discloses water-soluble glass containing a silver ion, zinc ion, copper ion or a mixture thereof. JP-A 20559/1990 discloses blending of protein silver. JP-A 93360/1992 discloses blending of ZnO, MgO, propionates or a mixture thereof. These proposals, however, suffer from several problems. For example, it is difficult to carry sufficient ions. Some agents cause silicone rubber to be discolored. Some agents lose an ion carrying ability and hence, their effect by high-temperature treatment. Some agents must be added in large amounts in order to maintain antifungal activity. Some agents are prohibited from the standpoint of food hygienics.

SUMMARY OF THE INVENTION

Therefore, an object of the present invention is to provide a novel and improved antibacterial, antifungal silicone rubber composition which exerts antibacterial and antifungal activities over a long time while maintaining the properties inherent to silicone rubber.

The inventors have found that by blending a silicone rubber composition with a zeolite containing 0.1 to 15% by weight of a silver ion, there is obtained a silicone rubber in which the silver ion-containing zeolite is dispersed. The silicone rubber having the silver ion-containing zeolite dispersed therein has excellent antibacterial and antifungal activities, which are resistant against a temperature change by vulcanization of the silicone rubber composition, a humidity change after vulcanization molding, and an environmental change as by exposure to ultraviolet radiation. Dispersion of the zeolite does not adversely affect the inherent properties of silicone rubber. The present invention is predicated on this finding.

According to the present invention, there is provided an antibacterial, antifungal silicone rubber composition comprising an organopolysiloxane and a zeolite containing 0.1 to 15% by weight of a silver ion. The organopolysiloxane is of the average compositional formula:

$$R_n^1 SiO_{(4-n)/2} \tag{1}$$

wherein $R^1$ which may be identical or different is a substituted or unsubstituted monovalent hydrocarbon group and n is a positive number of 1.98 to 2.02.

DETAILED DESCRIPTION OF THE INVENTION

A first essential component of the silicone rubber composition according to the preset invention is an organopolysiloxane of average compositional formula (1).

$$R_n^1 SiO_{(4-n)/2} \tag{1}$$

In formula $R^1$ may be identical or different and is a substituted or unsubstituted monovalent hydrocarbon group, preferably having 1 to 10 carbon atoms, more preferably 1 to 8 carbon atoms, which is selected from alkyl groups such as methyl, ethyl, propyl and butyl; cycloalkyl groups such as cyclohexyl; alkenyl groups such as vinyl, allyl, butenyl, and hexenyl; aryl groups such as phenyl and tolyl; and substituted ones thereof wherein some or all of the hydrogen atoms attached to carbon atoms of these groups are replaced by halogen atoms, cyano groups or the like, such as chloromethyl, trifluoropropyl and cyanoethyl. $R^1$ should preferably contain 0.001 to 5 mol%, more preferably 0.01 to 0.5 mol% of alkenyl group. Letter n is a positive number of 1.98 to 2.02. The organopolysiloxanes of formula (1) are preferably blocked at their molecular chain end with a trimethylsilyl, dimethylvinyl, dimethyl-hydroxysilyl, trivinylsilyl or similar group. They are preferably of straight chain although a mixture of two or more organopolysiloxanes of different molecular structure is acceptable.

Preferably the organopolysiloxanes have an average degree of polymerization of about 100 to 30,000, more preferably about 3,000 to 10,000 and a viscosity of at least about 100 centistokes at 25° C., more preferably about 100,000 to 10,000,000 centistokes at 25° C.

These organopolysiloxanes are generally prepared by co-hydrolysis condensation of one or more selected organohalogenosilanes or by ring-opening polymerization of cyclic polysiloxanes (siloxane trimer or tetramer) in the presence of alkaline or acidic catalysts.

If desired, reinforcing silica powder may be blended in the silicone rubber composition of the invention. The reinforcing silica powder is essential for producing silicone rubber having mechanical strength and to this end, should have a specific surface area of at least 50 m$^2$/g, especially 100 to 300 m$^2$/g. Silica powder having a specific surface area of less than 50 m$^2$/g would result in cured products with low mechanical strength. Examples of the reinforcing silica powder include fumed silica and precipitated silica. Surface treated (hydrophobic) silicas are preferable. Preferably the reinforcing silica powder is added in amounts of about 5 to 70 parts, especially about 30 to 50 parts by weight to 100 parts by weight of the first component or organopolysiloxane. Less than 5 parts of silica on this basis would be less effective for reinforcement whereas a silicone rubber composition containing more than 70 parts of silica on this basis would be difficult to work with and the resulting silicone rubber would be rather low in mechanical strength.

In such a silicone rubber composition, a zeolite containing 0.1 to 15% by weight of a silver ion is blended according to the present invention for the purpose of imparting antibacterial and antifungal properties thereto.

The zeolite used herein may be either natural or artificial zeolite. The zeolite is generally aluminosilicate having a three-dimensional skeleton structure and represented by the following general formula.

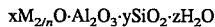

$$xM_{2/n}O \cdot Al_2O_3 \cdot ySiO_2 \cdot zH_2O$$

M is an ion capable of ion exchange, typically a monovalent or divalent metal ion, n is a valence of the (metal) ion, x and y are coefficients of the metal oxide and silica, and z is a number of crystallization water. Examples of the zeolite include A-type zeolite, X-type zeolite, Y-type zeolite, T-type zeolite, high silica zeolite, sodalite, mordenite, analcime, clinobutyronite, chabazite, and erionite though not limited thereto. These exemplary zeolites have an ion-exchange capacity of 7 meq/g for A-type zeolite, 6.4 meq/g for X-type zeolite, 5 meq/g for Y-type zeolite, 3.4 meq/g for T-type zeolite, 11.5 meq/g for sodalite, 2.8 meq/g for mordenite, 5 meq/g for analcime, 2.6 meq/g for clinobutyronite, 5 meq/g for chabazite, and 3.8 meq/g for erionite. They all have a sufficient capacity to ion exchange with ammonium and silver ions.

The antibacterial zeolite used herein is a zeolite in which an ion-exchangeable ion, for example, a sodium, calcium, potassium, magnesium, and iron ion is partially or entirely replaced by a silver ion. In addition to the silver ion, it may contain another antibacterial metal ion, for example, ions of copper, zinc, mercury, lead, tin, bismuth, cadmium, chromium and thallium, with the copper and zinc ions being preferred. It is desired that zeolite be replaced by an ammonium ion in addition to the silver ion.

From the standpoint of antibacterial activity, the silver ion should be contained in the zeolite in an amount of 0.1 to 15% by weight. A silver ion concentration of less than 0.1% is insufficient to provide antibacterial activity whereas more than 15% causes discoloration. These percentages are percents by weight based on the dry weight of zeolite at 110° C. Preferably the zeolite containing 0.2 to 5% by weight of a silver ion. Zeolite containing 0.2 to 5% by weight of a silver ion and 0.1 to 16% by weight of a copper or zinc ion is preferred for antibacterial activity. Ammonium ion can be contained in zeolite in amounts of up to 20% by weight although the content of ammonium ion in zeolite should preferably be 0.5 to 5% by weight, especially 0.5 to 2% by weight for preventing discoloration of zeolite.

Preferably the antibacterial zeolite is blended in the silicone rubber composition in an amount of about 0.05 to 50 parts, especially 0.5 to 10 parts by weight per 100 parts by weight of the first component or organopolysiloxane. Less than 0.05 parts of the zeolite would be less effective for rendering the composition antibacterial whereas a silicone rubber composition containing more than 50 parts of the zeolite on this basis would be difficult to work with and the resulting silicone rubber would be low in mechanical strength or discolored.

In the silicone rubber composition of the invention, a curing agent is blended for curing the organopolysiloxane in a conventional manner. Any of well-known curing agents may be used and curing can be done in a conventional manner suitable for the selected curing agent. More particularly, where crosslinking reaction takes place between hydrocarbons, suitable curing agents are organic peroxides such as benzoyl peroxide, 2,4-dichlorobenzoyl peroxide, p-methylbenzoyl peroxide, 2,4-dicumyl peroxide, 2,5-dimethyl-bis(2,5-t-butylperoxy)hexane, di-t-butyl peroxide, and t-butyl perbenzoate. The organic peroxide is preferably added in amounts of about 0.1 to 5 parts by weight per 100 parts by weight of the first component or organopolysiloxane.

In an embodiment where the organo-polysiloxane as the first component has an alkenyl group directly attached to a silicon atom, curing may be done by using an organohydrogenpolysiloxane having at least two hydrogen atoms each directly attached to a silicon atom in a molecule as the curing agent whereby crosslinking takes place through addition reaction. The organohydrogenpolysiloxane used herein may be straight, branched or cyclic, but preferably has a degree of polymerization of up to 300. Useful examples are a diorganopolysiloxane end-blocked with a dimethylhydrogensilyl group, copolymers consisting of a dimethylsiloxane unit, a methylhydrogensiloxane unit, and a terminal trimethylsiloxy unit, a low viscosity fluid consisting of a dimethylhydrogensiloxane (H(CH$_3$)$_2$SiO$_{1/2}$) unit and a SiO$_2$ unit, 1,3,5,7-tetrahydrogen- 1,3,5,7-tetramethylcyclotetrasiloxane, 1-propyl-3,5,7-trihydrogen- 1,3,5,7-tetramethylcyclotetrasiloxane, and 1,5-dihydrogen-3,7-dihexyl-1,3,5,7-tetramethylcyclotetrasiloxane. The organohydrogenpolysiloxane as the curing agent is desirably added in such amounts that the hydrogen atom directly attached to a silicon atom is 50 to 500 mol% relative to the alkenyl group of the organopolysiloxane as the first component.

Preferably the addition reaction is assisted by adding any of well-known platinum catalysts. Exemplary catalysts include platinum element alone, platinum compounds, platinum composites, chloroplatinic acid, complexes of chloroplatinic acid with alcohols, aldehydes, ethers and olefins. The platinum catalyst is added in an amount of about 1 to 2,000 ppm of platinum atom based on the organopolysiloxane as the first component.

In addition to the above-mentioned components, the silicone rubber composition of the invention may further contain fillers insofar as the benefits of the invention are not lost. Exemplary fillers are extending fillers such as ground quartz and calcium carbonate. Inorganic or organic blowing agents may be added if spongy products are desired. Exemplary blowing agents include azobisisobutyronitrile, dinitropentamethylenetetramine, and benzenesulfonhydrazide. The blowing agent is preferably added in an amount of 3 to 10 parts by weight per 100 parts by weight of the silicone rubber compound. When such a blowing agent is added to the inventive composition, spongy silicone rubber is available.

If desired, the composition of the invention may further contain various additives such as coloring agents and heat-resistance enhancing agents as well as reaction control agents, mold release agents and filler dispersants. Exemplary filler dispersants are diphenylsilane diol, various alkoxysilanes, carbon functional silanes, and silanol group-containing low molecular weigh siloxanes although their addition amount should be minimized so as to avoid any adverse influence.

The silicone rubber composition of the invention is prepared by uniformly mixing the essential and optional components by means of a rubber kneader such as a two-roll mill, Bunbury mixer and dough mixer followed by optional heat treatment. If desired, the composition is prepared by premixing the first component or organopolysiloxane and a second component or reinforcing silica to form a base compound, adding a third component or antibacterial zeolite and optionally a fourth component or curing agent thereto, and mixing them.

The silicone rubber composition can be molded into a desired silicone rubber shape by conventional molding techniques such as casting, compression molding and extrusion molding. The molded product is post cured at 100° to 200° C. for 2 to 24 hours if desired.

By curing the silicone rubber composition, there is obtained a silicone rubber having the silver ion-containing zeolite dispersed therein which exerts antibacterial and antifungal activities in a stable manner over a long term and possesses favorable rubber properties. Then the silicone rubber finds applications as packings or gaskets in home appliances such as refrigerators, electric rice cookers, electric pots, and microwave ovens, packings in food-keeping containers, tubes and hoses in automatic beverage vending machines, packings in cosmetic containers and cosmetic puff, and medical tubes.

EXAMPLE

Examples of the invention are given below by way of illustration and not by way of limitation. All parts are by weight.

Preparation of antibacterial zeolites

Two commercially available zeolites were used: A-type zeolite ($Na_2O \cdot Al_2O_3 \cdot 2SiO_2 \cdot xH_2O$, mean particle size 4.3 μm) and Y-type zeolite $Na_2O \cdot Al_2O_3 \cdot 4SiO_2 \cdot xH_2O$, mean particle size 0.7 μm). Four metal salts: $AgNO_3$, $Cu(NO_3)_2$, $Zn(NO_3)_2$, and $NH_4NO_3$ were used as the salt for providing an ion for ion exchange. Table 1 shows the type of zeolite and the content of metal ions used in preparing antibacterial zeolite Nos. 1 to 5.

Each sample was prepared by weighing 1 kg of zeolite powder which had been dried by heating at 110° C., suspending the zeolite in 1 liter of water, and adding dropwise an aqueous solution of 0.05N nitric acid at a rate of 100 ml/30 min. until a desired pH value (5 to 7) was reached. To the slurry, 3 liters of an aqueous mix solution containing silver nitrate, copper nitrate, zinc nitrate and ammonium nitrate in predetermined concentrations was added for ion exchange. This reaction was achieved by agitating at a temperature of room temperature to 60° C. for 24 hours until an equilibrium state was reached. At the end of ion exchange, the zeolite phase was collected by filtration and washed with room temperature water or warm water until the excess of exchange cation was removed from the zeolite phase. The sample was finally dried by heating at 110° C. Five samples were obtained in this way.

TABLE 1

| Sample No. | Zeolite | Content in zeolite, wt % | | | |
| --- | --- | --- | --- | --- | --- |
| | | Ag | Cu | Zn | Ammonium |
| 1 | A-type zeolite | 0.5 | 0 | 15.0 | 1.0 |
| 2 | A-type zeolite | 5.0 | 0 | 12.0 | 1.0 |
| 3 | A-type zeolite | 14.5 | 1.0 | 8.0 | 1.0 |
| 4 | Y-type zeolite | 0.2 | 0 | 12.5 | 0 |
| 5 | Y-type zeolite | 3.5 | 7.5 | 0 | 0.5 |

EXAMPLES 1–5

To 100 parts of an organopolysiloxane consisting of 99,825 mol% of a dimethylsiloxane unit, 0.15 mol% of a methylvinylsiloxane unit, and 0,025 mol% of a dimethylvinylsiloxane unit and having an average degree of polymerization of about 8,000 were added 3 parts of diphenyl-silane diol as a dispersant, 4 parts of a silanol group-terminated dimethylpolysiloxane having a degree of polymerization of 10, and 40 parts of fumed silica having a specific surface area of 200 $m^2/g$ (commercially available from Nippon Aerosil K.K.). The ingredients were mixed and heat treated for 2 hours to obtain a base compound.

To 100 parts of the base compound, 0.5, 5 or 12 parts of each of antibacterial zeolite Nos. 1 to 5 was added in a two-roll mill. Dispersion was accomplished by a three-roll mill. By further adding 0.8 parts of 2,5 -dimethyl-bis(2,5-t-butylperoxy)hexane thereto, a silicone rubber composition was prepared. It was press cured at 165° C. for 10 minutes and post cured at 200° C. for 4 hours, obtaining an antibacterial silicone rubber sheet.

COMPARATIVE EXAMPLE 1

A silicone rubber sheet was obtained by the same procedure as in Example 1 except that no antibacterial zeolite was added to the base compound.

COMPARATIVE EXAMPLE 2

A silicone rubber sheet was obtained by the same procedure as in Example 1 except that benzimidazole was added as an organic antifungal agent to the base compound.

The thus obtained silicone rubber sheets were examined for antibacterial and antifungal activities.

Antibacterial test

Each sample (50×50 mm) was treated with flowing water for one hour. Then 1 ml of a solution containing $10^5$ cells/ml of Staphylococcus aureus (abbreviated as SA) and 1 ml of a solution containing $10^5$ cells/ml of *Escherichia coli* (abbreviated as EC) were placed on the sample and incubated at 37° C. for 24 hours. Thereafter, the bacterial cells were washed out with sterilized phosphate buffered solution (PBS). The viable cell count in the wash solution was measured by a pour plate method using cell counting media. The results are shown in Table 2.

Antifungal test

Each sample (50 mm in diameter, 2 mm thick) was tested according to JIS Z-2911. A potato dextrose agar medium was used and cultivation done at 28° C. for 14 days. The fungi tested were *Aspergillus terreus* (abbreviated as AT), *Penicillium funicolosum* (abbreviated as PF), *Cladosporium cladosporioides* (abbreviated as CC), and *Chaetomium globosum* (abbreviated as CG). The test results were rated in a 0–5 point scale as shown below.

Point Growth of fungal cells 0 no fungal growth on sample surface
1 less than 10% of sample surface area
2 10–20% of sample surface area
3 20–30% of sample surface area
4 30–40% of sample surface area
5 more than 40% of sample surface area The test results are shown in Table 3.

TABLE 2

| | Amount of antibacterial zeolite (g) | Viable cell count (/ml) SA | Viable cell count (/ml) EC | Sheet discoloration |
|---|---|---|---|---|
| Example 1 | 0.5 | $1.0 \times 10^1$ | $1.0 \times 10^1$ | no |
| | 5 | 0 | 0 | no |
| | 12 | 0 | 0 | no |
| Example 2 | 0.5 | 0 | 0 | no |
| | 5 | 0 | 0 | no |
| | 12 | 0 | 0 | slightly yellowed |
| Example 3 | 0.5 | 0 | 0 | no |
| | 5 | 0 | 0 | slightly yellowed |
| | 12 | 0 | 0 | slightly yellowed |
| Example 4 | 0.5 | $1.0 \times 10^1$ | $1.0 \times 10^1$ | no |
| | 5 | 0 | 0 | no |
| | 12 | 0 | 0 | no |
| Example 5 | 0.5 | 0 | 0 | no |
| | 5 | 0 | 0 | no |
| | 12 | 0 | 0 | slightly yellowed |
| Comparative Example 1 | 0 | $1.5 \times 10^5$ | $3.4 \times 10^5$ | no |
| Comparative Example 2 | 0.1 | $8.3 \times 10^4$ | $3.4 \times 10^5$ | yellowed |
| | 0.5 | $6.3 \times 10^4$ | $1.3 \times 10^5$ | yellowed |
| | 1.0 | $2.3 \times 10^4$ | $3.2 \times 10^4$ | yellowed |

TABLE 3

| | Amount of antibacterial zeolite (g) | Point in antifugal test AT | PF | CC | CG |
|---|---|---|---|---|---|
| Example 1 | 0.5 | 2 | 1 | 2 | 1 |
| | 5 | 1 | 0 | 2 | 0 |
| | 12 | 1 | 0 | 1 | 0 |
| Example 2 | 0.5 | 1 | 1 | 1 | 0 |
| | 5 | 0 | 0 | 1 | 0 |
| | 12 | 0 | 0 | 1 | 0 |
| Example 3 | 0.5 | 1 | 0 | 1 | 0 |
| | 5 | 0 | 0 | 1 | 0 |
| | 12 | 0 | 0 | 1 | 0 |
| Example 4 | 0.5 | 2 | 1 | 2 | 1 |
| | 5 | 1 | 1 | 2 | 0 |
| | 12 | 1 | 1 | 1 | 0 |
| Example 5 | 0.5 | 1 | 1 | 1 | 0 |
| | 5 | 0 | 0 | 1 | 0 |
| | 12 | 0 | 0 | 1 | 0 |
| Comparative Example 1 | 0 | 4 | 5 | 4 | 5 |
| Comparative Example 2 | 0.1 | 5 | 4 | 4 | 4 |
| | 0.5 | 4 | 4 | 3 | 4 |
| | 1.0 | 4 | 4 | 4 | 5 |

The antibacterial silicone rubber having added thereto 0.5 g of the antibacterial zeolite of Example 1 and the silicone rubbers of Comparative Examples 1 and 2 were subjected to various durability tests. The results are shown in Tables 4 to 6.

Heat resistance test

The sheet samples were kept in an oven at 100° C., 200° C., and 250° C. for three days before physical properties were measured to determine a change thereof before and after heat treatment.

Hot water immersion test

The sheet samples were immersed in water at 50° C. and 80° C. for 7 to 14 days and dried in air at room temperature for one day before physical properties were measured.

Pressure cooker test

The sheet samples were kept in an autoclave filled with steam at 150° C. before physical properties were measured.

TABLE 4

Heat resistant test

| | Properties | Plain sample (Comparative Example 1) | Antibacterial silicone rubber (Example 1) | Antibacterial silicone rubber (Comparative Example 2) |
|---|---|---|---|---|
| Initial | Outer appearance | milky white translucent | milky white | yellow |
| | Specific gravity @25° C. | 1.16 | 1.17 | 1.17 |
| | Hardness (JIS-A) | 61 | 61 | 58 |
| | Tensile strength (kgf/cm$^2$) | 115 | 112 | 101 |
| | Elongation (%) | 390 | 390 | 468 |
| | Tear strength A (kgf/cm) | 16 | 17 | 15 |
| | Impact resilience (%) | 55 | 44 | 40 |
| | Compression set @100° C./22 hr. | 7 | 6 | 12 |
| 100° C. × 3 days | Hardness (JIS-A) | 60 (+1 point) | 61 (±0 point) | 58 (±0 point) |
| | Tensile strength (kgf/cm$^2$) | 119 (+3%) | 104 (−7%) | 100 (−1%) |
| | Elongation (%) | 385 (−3%) | 370 (−5%) | 459 (−2%) |
| 200° C. × 3 days | Hardness (JIS-A) | 65 (+4 points) | 65 (+4 points) | 62 (−4 points) |
| | Tensile strength (kgf/cm$^2$) | 109 (−5%) | 107 (−4%) | 98 (−3%) |
| | Elongation (%) | 345 (−12%) | 340 (−13%) | 410 (−12%) |
| 250° C. × 3 days | Hardness (JIS-A) | 78 (+17 points) | 72 (+11 points) | 73 (+15 points) |
| | Tensile strength (kgf/cm$^2$) | 64 (−44%) | 75 (−33%) | 63 (−37%) |
| | Elongation (%) | 75 (−81%) | 160 (−59%) | 81 (−83%) |

TABLE 5

Hot water immersion test

| | Properties | Plain sample (Comparative Example 1) | Antibacterial silicone rubber (Example 1) | Antibacterial silicone rubber (Comparative Example 2) |
|---|---|---|---|---|
| 50° C. × 7 days | Hardness (JIS-A) | 63 (+2 points) | 62 (+1 point) | 59 (+1 point) |
| | Tensile strength (kgf/cm$^2$) | 99 (−14%) | 93 (−17%) | 92 (−9%) |
| | Elongation (%) | 330 (−15%) | 345 (−12%) | 410 (−12%) |
| 50° C. × 14 days | Hardness (JIS-A) | 63 (+2 points) | 65 (+4 points) | 61 (+3 points) |
| | Tensile strength (kgf/cm$^2$) | 101 (−12%) | 108 (−4%) | 90 (−11%) |
| | Elongation (%) | 345 (−12%) | 390 (±0%) | 416 (−11%) |
| 80° C. × 7 days | Hardness (JIS-A) | 70 (+9 points) | 66 (+5 points) | 66 (+8 points) |
| | Tensile strength (kgf/cm$^2$) | 95 (−17%) | 98 (−12%) | 88 (−13%) |
| | Elongation (%) | 310 (−21%) | 340 (−13%) | 371 (−20%) |
| 80° C. × 14 days | Hardness (JIS-A) | 68 (+7 points) | 67 (+6 points) | 66 (+8 points) |
| | Tensile strength (kgf/cm$^2$) | 90 (−22%) | 94 (−16%) | 80 (−21%) |
| | Elongation (%) | 310 (−21%) | 360 (−8%) | 360 (−23%) |

TABLE 6

| | Properties | Plain sample (Comparative Example 1) | Antibacterial silicone rubber (Example 1) | Antibacterial silicone rubber (Comparative Example 2) |
|---|---|---|---|---|
| 3 days | Hardness (JIS-A) | 68 (+8 points) | 68 (+7 points) | 66 (+8 points) |
| | Tensile strength (kgf/cm$^2$) | 97 (−16%) | 94 (−16%) | 91 (−10%) |
| | Elongation (%) | 339 (−13%) | 363 (−7%) | 351 (−25%) |
| 7 days | Hardness (JIS-A) | 70 (+10 points) | 69 (+8 points) | 67 (+9 points) |
| | Tensile strength (kgf/cm$^2$) | 93 (−19%) | 83 (−28%) | 85 (−16%) |
| | Elongation (%) | 323 (−17%) | 332 (−15%) | 331 (−29%) |
| 14 days | Hardness (JIS-A) | 68 (+8 points) | 70 (+9 points) | 68 (+10 points) |
| | Tensile strength (kgf/cm$^2$) | 77 (−33%) | 72 (−37%) | 70 (−31%) |
| | Elongation (%) | 261 (−33%) | 285 (−27%) | 232 (−50%) |

There has been described a silicone rubber composition which yields a highly antibacterial and antifungal silicone rubber possessing good physical properties.

Japanese Patent Application No. 5-235798 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An antibacterial, antifungal silicone rubber composition comprising an organopolysiloxane of the average compositional formula:

$$R_n^1 SiO_{(4-n)/2} \quad (1)$$

wherein $R^1$, which may be identical or different, is a substituted or unsubstituted monovalent hydrocarbon group and n is a positive number of 1.98 to 2.02, an organic peroxide or an organohydrogen polysiloxane and platinum catalyst as a curing agent, and a zeolite containing 0.1 to 15% by weight of a silver ion, based on the weight of the zeolite, said composition being prepared by milling substantially all of the organopolysiloxane and substantially all of the zeolite by a three-roll mill.

2. The composition of claim 1 which contains 100 parts by weight of the organopolysiloxane and about 0.05 to about 50 parts by weight of the zeolite per 100 parts by weight of organopolysiloxane.

3. The composition of claim 1 wherein said zeolite further contains a copper or zinc ion.

4. The composition of claim 1 wherein said zeolite further contains an ammonium ion.

5. The composition of claim 1, wherein all components are milled on a three-roll mill.

* * * * *